United States Patent
Braghiroli

(10) Patent No.: US 8,674,684 B2
(45) Date of Patent: Mar. 18, 2014

(54) SCANNER SYSTEM FOR GARAGE EQUIPMENT FOR MOTOR VEHICLE GARAGES

(75) Inventor: Francesco Braghiroli, Reggio Emilia (IT)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 388 days.

(21) Appl. No.: 13/032,323

(22) Filed: Feb. 22, 2011

(65) Prior Publication Data

US 2011/0204880 A1 Aug. 25, 2011

(30) Foreign Application Priority Data

Feb. 22, 2010 (EP) .................................... 10001780

(51) Int. Cl.
*G01B 7/14* (2006.01)
*G01N 27/72* (2006.01)

(52) U.S. Cl.
USPC ...................................... 324/207.15; 324/228

(58) Field of Classification Search
USPC ............................................ 324/228, 207.15
See application file for complete search history.

(56) References Cited

U.S. PATENT DOCUMENTS

| | | | |
|---|---|---|---|
| 5,258,708 A * | 11/1993 | Sadeghi et al. | 324/240 |
| 5,447,064 A | 9/1995 | Drechsler et al. | |
| 5,563,342 A | 10/1996 | Drechsler et al. | |
| 5,886,775 A * | 3/1999 | Houser et al. | 356/4.01 |
| 5,969,822 A | 10/1999 | Fright et al. | |
| 2002/0051006 A1 | 5/2002 | Katagiri et al. | |
| 2004/0208358 A1 | 10/2004 | Tooyama et al. | |
| 2005/0251017 A1 | 11/2005 | Azar | |
| 2009/0082989 A1 | 3/2009 | Zuhars et al. | |

FOREIGN PATENT DOCUMENTS

| | | |
|---|---|---|
| JP | 2004-202260 | 7/2004 |
| WO | 2007030026 A1 | 3/2007 |

OTHER PUBLICATIONS

Eugene Paperno and Pavel Keisar, "Three-Dimensional Magnetic Tracking of Biaxial Sensors" in IEEE Transactions on Magnetics, vol. 40, No. 3, May 2004, pp. 1530 to 1536.

\* cited by examiner

*Primary Examiner* — Bot Ledynh
(74) *Attorney, Agent, or Firm* — McDermott Will & Emery LLP

(57) ABSTRACT

The present invention concerns a scanner system for scanning the surface of an object, especially a vehicle wheel, the system comprises a mobile scanner including at least one sensor adapted to sense at least one position on the surface of the object and a reference system to which the sensor is sensitively adapted to provide at least one sensor signal corresponding the at least one sensed position on the surface with respect to the reference system, wherein the reference system is designed to provide a magnetic field having at least one orientation and the sensor is a magnetic sensor to be positioned within said magnetic field in proximity of or on the surface to be scanned.

15 Claims, 4 Drawing Sheets

Figure 1:
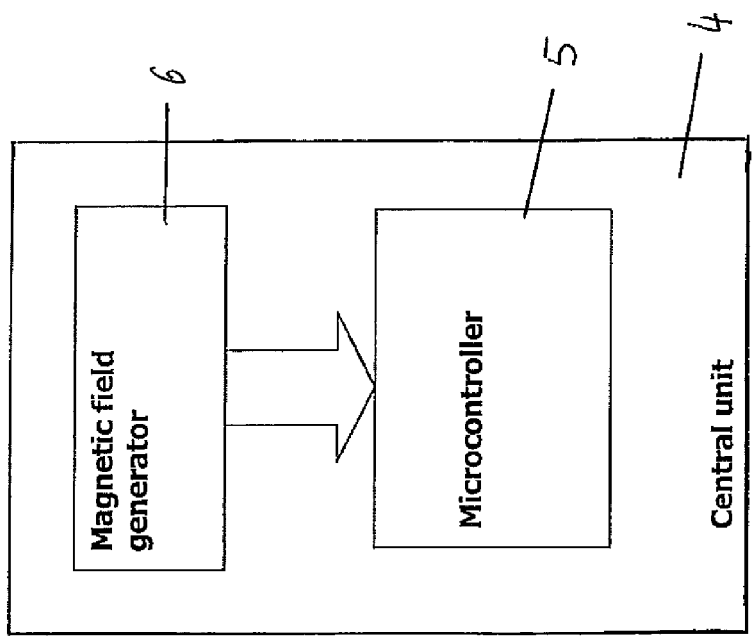
Figure 1:
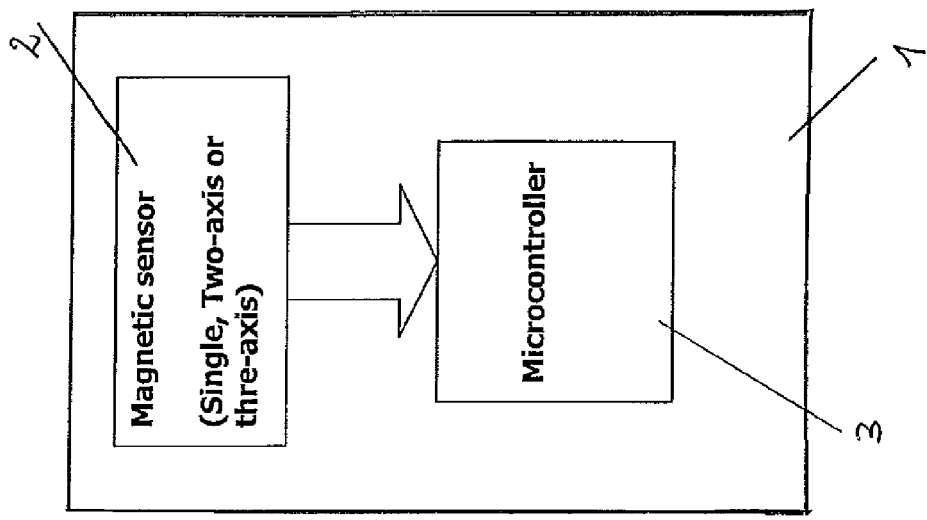

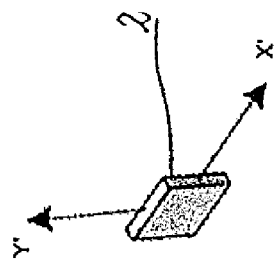
Fig. 2
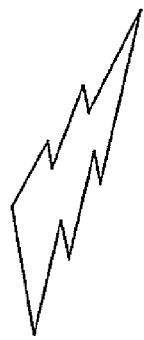
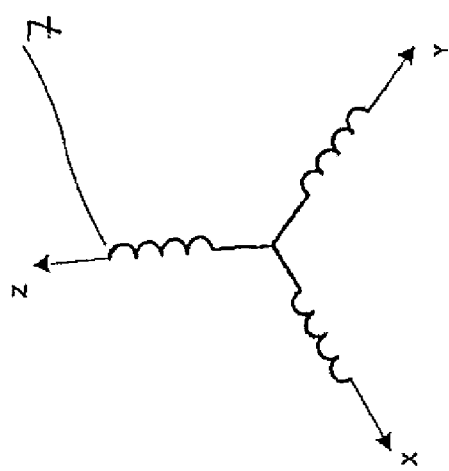

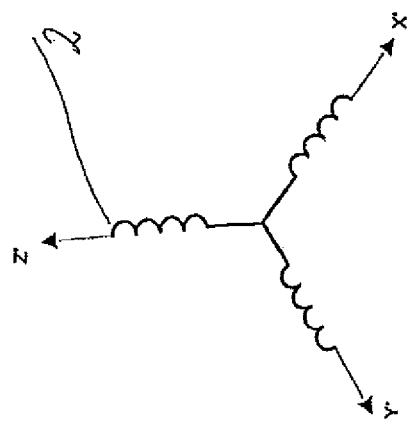
Fig. 4
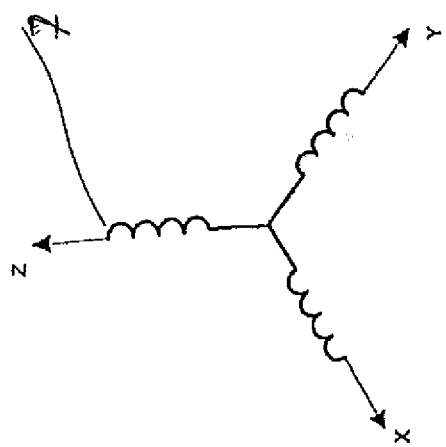

SCANNER SYSTEM FOR GARAGE EQUIPMENT FOR MOTOR VEHICLE GARAGES

The invention is related to a scanner system for garage equipment for motor vehicle garages such as tyre changers, tyre balancing machines, wheel alignment systems, roller test benches and other vehicle service machines, for scanning the surface of a vehicle wheel rim or other vehicle components.

Such a scanner system which is disclosed in WO 2007/030026 A1 includes a mobile scanner with sensor means adapted to scan the surface of an object and to sense the location of surface points relative to the scanner. The scanner provides an optical tracking to produce photo-realistic 3D data of the scanned surface.

Further, it is known from Engene Paperno and Pavel Keisar, Three-Dimensional Magnetic Tracking of Biaxial Sensors in IEEE TRANSACTIONS ON MAGNETICS, VOL. 40, No. 3, May 2004, pages 1530 to 1536, to apply magnetic tracking to intrabody navigation of medical instruments and eye tracking. The magnetic tracking is based on vector outputs of a magnetic sensor combined into an orientation invariant scalar signal which is proportional to the total magnetic field magnitude at the location of the magnetic sensor.

The problem to be solved by the invention is to provide a scanner system for scanning the surface of an object and to indicate at least one position on the surface of the object, especially of a vehicle wheel.

The problem is solved by means of the features of claim 1, whereas the subs claims disclose advantageous modifications of the invention.

The invention provides a scanner system for scanning the surface of an object which comprises a mobile scanner including at least one sensor adapted to sense at least one position on the surface of the object and a reference system to which the sensor is sensitively adapted to provide at least one sensor signal corresponding to the at least one sensed position on the surface with respect to the reference system. The reference system of the invention is designed to provide a magnetic field having at least one orientation and the sensor is a magnetic sensor to be positioned within said magnetic field in proximity of or on the surface to be scanned.

The scanner system is used preferably for scanning the surface of a vehicle wheel, especially of the rim surface. By guiding the scanner within a plane which intersects the wheel axis, the profile of the rim especially on the rim edge or along the rim surface on which balancing weights are to be fixed can be determined from the achieved sensor signals. The scanning can be performed on the vehicle wheel while fixed on the shaft of a wheel balancer or of a tyre changer or on a vehicle wheel positioned in another service system. For instance the wheel is mounted on the axle of a vehicle which is positioned in a wheel alignment system.

The reference system of the scanner system can be provided by means of a stationary magnetic field which is preferably associated with a machine frame of a vehicle service machine such as a wheel balancer, a tyre changer, a brake test bench or a wheel alignment system. The machine frame can comprise a shaft or axle onto which a vehicle wheel whose surface is to be scanned can be mounted.

The mobile scanner can be designed to keep the magnetic sensor in a predetermined spatial orientation, particularly with respect to the Earth's magnetic field present on the scanning location. For that, the scanner can be fixed on a guiding means which moves the scanner along a predetermined path, especially parallel to the vehicle wheel axis for achieving the profile of the rim. The predetermined path depends on the specific application and the object to be measured. Furthermore several predetermined paths can be provided, one of which can be selected for the intended application. Guiding means in form of a telescopic lever are known on a wheel balancer from U.S. Pat. Nos. 5,447,064 and 5,563,342. The scanner may be fixed at the distal tip or free end of the lever.

The magnetic sensor can be sensitive in two or three perpendicular orientations (axes) and can be designed as a biaxial or triaxial magnetic sensor. The magnetic field of the reference system is preferably oriented in three orthogonal axes.

The magnetic field of the reference system can be a static field or a modulated field. In both cases, the magnetic field can be produced by means of coils which are driven with electric current. If the current is a continuous current, the field will produce a static field. The different coils could be activated at different times in order to allow an easier detection. If the coil current is time-varying, i.e. modulated in a known way, the detection is more robust as the detection algorithms can take this into account.

The magnetic field of the reference system can be provided by one or more magnetic field generators each comprising one or more coils. Furthermore, one or more of the magnetic field generators can be activated or deactivated in response to a position of the mobile scanner.

The at least one sensor of the scanner can be designed as a solid-state magnetic sensor, especially based on Hall effect, anisotropic magneto resistance (AMR) or giant magneto resistance (GMR). The sensor signal is proportional to the total field magnitude at sensor's location. To achieve such a signal, the vector outputs of the at least one magnetic receiver can be combined into an orientation invariant scalar signal which is proportional to the total field magnitude at the sensor's location.

The mobile scanner is designed preferably in form of a hand-held scanner for a free motion within the sensitive area of the artificial magnetic field of the reference system.

The mobile scanner can include or can be combined with additional position detecting means, which can be based on time-of-flight ultrasonic trilateration (TOF) or on acceleration measurement, especially by means of MEMS accelerometers. With the aid of the position detecting means, velocity or path length of the mobile scanner can also be detected.

The mobile scanner can be connected to a central unit of the reference system or the vehicle service machine by means of a wireless connection for transmitting measurement data. The wireless connection can use undirected or directed radio frequency (RF) transmission, infrared light transmission or other wireless transmission technologies suitable for the operational environment. A wired connection can be used as well.

Figure 3:
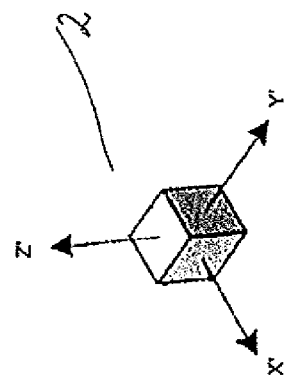
Figure 3:
Figure 3:
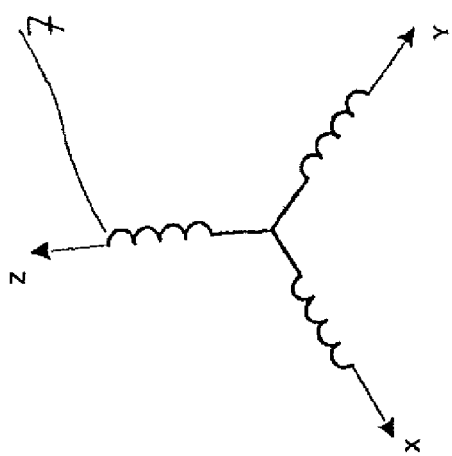

The invention will be explained additionally with reference to the drawings which show in FIG. 1 a block diagram of an embodiment of the invention;

FIG. 2 a first example of transmitter-/receiver arrangement which can be incorporated into the embodiment of FIG. 1;

FIG. 3 a second example of a transmitter-/receiver arrangement which can be incorporated into the embodiment of FIG. 1; and FIG. 4 a third example of a transmitter-/receiver arrangement which can be incorporated into the embodiment of FIG. 1.

The embodiment shown in FIG. 1 includes a central unit 4 comprising a magnetic field generator 6 which generates an artificial magnetic field establishing the reference system within which the motion and location of a mobile scanner 1 can be tracked. The mobile scanner is preferably designed as a hand-held scanner.

The scanner can be designed for a free motion or for a guided motion along a predetermined path and/or within a plane.

For producing the artificial magnetic field, the generator 6 includes a transmitter 7, especially a three-axial transmitter (FIGS. 2 to 4). The transmitter consists essentially of three orthogonal coil arrangements which are driven by an electric current source of the generator 6. If the current is continuous, a static magnetic field is produced. A modulated magnetic field can be produced by a time-varying current and an improved detection can be achieved as the detection algorithm can take the modulation into account.

The magnetic field generator 6 can include one or more transmitters 7 in order to provide an area of high resolution within which the motion and location of the magnetic sensor is to be tracked during the scanning of the surface of object, especially of the vehicle wheel or of a part of the vehicle wheel, for instance the tyre or the rim. The generator is installed in a central unit 4 which can be a part of a vehicle service machine, like a wheel balancer, wheel alignment system, a tyre changer, a brake test bench or other vehicle test or measuring systems. The central unit 4 can also be an independent component of a test bench lane comprising a plurality of vehicle test equipment, or can be integrated in any test bench or vehicle service machine that is part of a test bench lane. The generator 6 is operatively connected with an electronic computing device, for instance a microcontroller 5 which analyses the scalar signals received from the transmitter 7 or from the different transmitters of the generator 6 and combines therewith the vector output signals provided by the microcontroller 3 which is in operatively connection with the magnetic sensor 2. An appropriate magnetic tracking method is described by Engene Paperno and Pavel Keisar in the above mentioned publication.

For measuring longer distances or greater areas a plurality of magnetic field generators 6 each having one or more transmitters 7 or coils can be provided. In this manner, a more complex reference system can be provided, or several independent reference systems can be provided which can be in a predetermined spatial relationship to each other. In order to enable a precise and unambiguous measuring over the whole measuring area spanned by the plurality of magnetic field generators 6, every magnetic field generator 6 can use a unique magnetic field characteristic such as a unique modulation of the magnetic field. In this manner, the position and orientation of the magnetic sensor 2 (sensor probe) relative to certain magnetic field generators 6 can be measured with high precision, wherein the measurement can be improved by using a plurality of generators 6 simultaneously. In another embodiment it is possible to prevent some generators 6 from influencing the measurement by activating or deactivating one or more of the plurality of magnetic field generators 6 in response to a position information derived from the data signals (vector output signals) of the mobile scanner 1 (i.e. the magnetic sensor 2), for example. In this manner the measurement can be facilitated or improved in precision.

The magnetic sensor 2 of the FIG. 2 is a biaxial solid-state sensor and the magnetic sensor 2 of the FIG. 3 is a three-axial solid-state sensor. The magnetic sensor of the FIG. 3 consists of three concentric orthogonal induction coils.

The mobile scanner 1 can be connected to the microcontroller of a central unit 4 via a wired connection or a wireless connection. A wireless connection is particularly advantageous if the mobile scanner 1 is designed for a free motion so that the motion is not obstructed by a connection cable. Furthermore, in a vehicle garage environment a data cable connection is easily subjected to damage so that a wireless connection can be more reliable. The wireless connection for transmitting the measurement values (output vectors) of the mobile scanner 1 can use any known wireless transmission technology. If the motion of the mobile scanner 1 is restricted to a predetermined path, directed transmission technologies are preferred, such as an infrared light communication link or a directed radio (RF) communication link, for example, in order to increase reliability and electromagnetic compatibility. If the motion of the mobile scanner 1 is not restricted to a predetermined path and can comprise longer distances and various spatial orientations of the mobile scanner 1 relative to a corresponding receiver at the central unit 4, an undirected transmission technology is preferred such as radio communication link (wireless RF communication). The kind of transmission technology used for data transmission depends on the particular application and operational environment, and can also depend on the power source used by the mobile scanner 1.

The power source for the mobile scanner 1 can be an electric accumulator or battery contained in the mobile scanner 1. In a further embodiment, the mobile scanner 1 can be powered by the modulated magnetic field provided by the magnetic field generator 6 or by another electromagnetic field provided by a separate RF source (not shown), for example. In this case, the mobile scanner 1 comprises an electric power circuit (not shown) extracting energy from the varying magnetic field or RF field and providing that energy to the electric circuits of the mobile scanner 1 via a suitable capacitor (not shown), for example. The electric power circuit of the mobile scanner 1 can be deactivated during the proper measuring period so that the measurement is not affected by a retroactive effect on the magnetic field of the magnetic field generator 6. In this case, the capacitor is able to store enough energy for performing the measurement during a measuring period. In another embodiment different frequencies can be used for a modulated magnetic field and an RF power transmission to the mobile scanner 1 so that there is no interference between the power transmission and the measurement. Other wireless power transmission technologies can be used, too, such as inductive coupling or capacitive coupling of the hand-held mobile scanner 1 to a recharging device in a mobile scanner placement area.

Besides using the scanner system of the invention with a wheel balancer for assisting placement of balancing weights, other applications are possible, too. For example, the scanner system of the invention can be used with a roller test bench such as a brake test bench or a power test bench. In this case, the scanner system can provide further information such as wheel dimensions or geometrical characteristics of the rim or the tyre. This information can be used to adapt the testing procedure (adjusting sensor devices, for example, such as optical scanners provided between the rollers of a brake test bench scannig the tire profile) or provide additional data for the evaluation of testing results.

LIST OF REFERENCE SIGNS

1 mobile scanner
2 magnetic sensor
3 microcontroller
4 central unit
5 microcontroller
6 magnetic field generator
7 transmitter

The invention claimed is:

1. A vehicle service system comprising a scanner system for scanning a surface of a vehicle component, the scanner system comprising:
 a mobile scanner including at least one sensor, the scanner being adapted to sense at least one position on the surface of the vehicle component,
 a reference system to which the sensor is sensitively adapted to provide at least one sensor signal corresponding to the at least one sensed position on the surface with respect to the reference system,
 wherein the reference system is designed to provide a magnetic field having at least one orientation, and
 wherein the sensor is a magnetic sensor to be positioned within said magnetic field in proximity of or on the surface to be scanned, and
 a central unit configured to track motion and location of the mobile scanner within the magnetic field of the reference system.

2. The system according to claim 1,
 wherein the reference system comprises a stationary positioned magnetic field.

3. The system according to claim 1,
 wherein the mobile scanner is designed to keep the magnetic sensor in a predetermined spatial orientation.

4. The system according to claim 1,
 wherein the magnetic sensor is sensitive in two or three perpendicular orientations (axes).

5. The system according to claim 1,
 wherein the magnetic field of the reference system is oriented in three orthogonal axes.

6. The system according to claim 1,
 wherein the magnetic field of the reference system is a static field or a modulated field.

7. The system according to claim 1,
 wherein the magnetic field of the reference system is produced by means of one or more coils.

8. The system according to claim 1,
 wherein the at least one sensor is designed as a solid-state magnetic sensor.

9. The system according to claim 1,
 wherein the sensor signal is proportional to the total field magnitude at the sensor's location.

10. The system according to claim 1,
 wherein the mobile scanner is designed in form of a hand-held scanner.

11. The system according to claim 1,
 wherein the mobile scanner includes or is combined with an additional position detecting device based on time-of-flight ultrasonic trilateration or on acceleration measurement.

12. The system according to claim 1,
 wherein the magnetic field of the reference system is associated with a machine frame adapted to receive the object to be scanned.

13. The system according to claim 1,
 wherein the mobile scanner is connected to the reference system via a wireless communication link.

14. The system according to claim 1,
 wherein the mobile scanner is powered via a wireless power transmission device.

15. The system according to claim 1,
 wherein the magnetic field of the reference system is provided by one or more magnetic field generators each comprising one or more coils.

* * * * *